(No Model.)
W. IRVINE.
HAME.
No. 548,368. Patented Oct. 22, 1895.
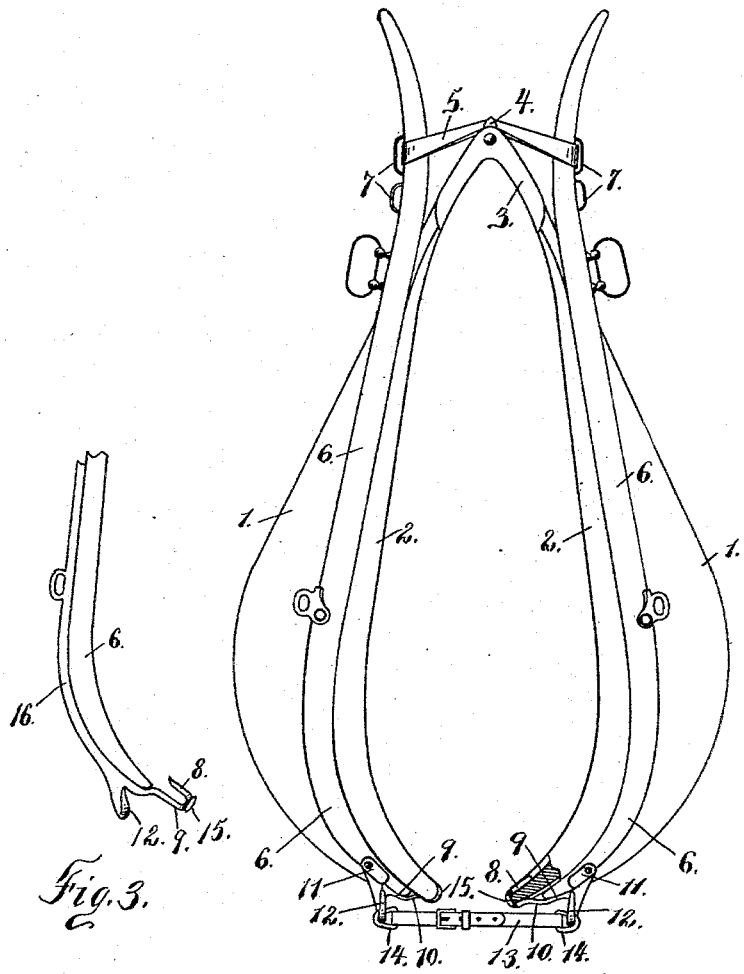
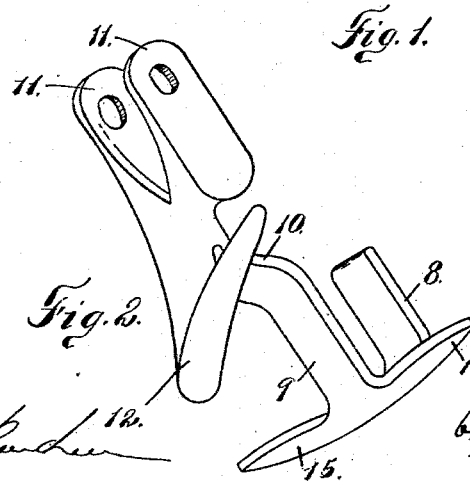
Witnesses:
F. P. Keston.
J. W. [illegible]
Inventor
William Irvine
by W. F. Miller
Attorney
ANDREW B.GRAHAM, PHOTO-LITHO. WASHINGTON D.C.

UNITED STATES PATENT OFFICE.

WILLIAM IRVINE, OF BUFFALO, NEW YORK, ASSIGNOR OF THREE-FOURTHS TO HENRY S. RUHL AND CHARLES RUHL, OF SAME PLACE.

HAME.

SPECIFICATION forming part of Letters Patent No. 548,368, dated October 22, 1895.

Application filed May 18, 1895. Serial No. 549,785. (No model.)

*To all whom it may concern:*

Be it known that I, WILLIAM IRVINE, a citizen of the United States, residing at Buffalo, in the county of Erie and State of New York, have invented certain new and useful Improvements in Hames; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in that class of hames which are adapted for use with what are known as "divided horse-collars."

Prior to my invention it has been customary to secure the hames to the two separate side sections of the divided collar by bolts and nuts or other analogous fastenings, which are passed through the collar.

The object of my invention is to provide the hames with improved means for securing them much more quickly to the collar and without the injurious puncturing of the same; and to that end it consists of metallic hooks secured at the extreme lower ends of the hames, the ends of which hooks extend back in line with the inside of the hames and are adapted for removable engagement with the crease between the body and roll of the collar.

My invention further consists in an improved form of hooks for removably securing the ends of the lower hame-fastener.

I will now describe the manner in which I have carried out my invention, and then claim what I believe to be novel.

In the drawings, Figure 1 is a front elevation of a horse-collar, partly in section, showing my improved hames attached thereto. Fig. 2 is a perspective view of the hooks detached, and Fig. 3 shows a modification.

Referring to the drawings, 1 is the body, and 2 the roll, of the horse-collar, which is made, as shown, in two separate side sections. Their upper ends are adjustably secured to the fastener 3, which is provided with a loop 4, through which is passed the upper hame-fastener 5. The hames 6 6 have the usual series of loops 7, through which the upper hame-fastener 5 is passed in securing the upper ends of the hames 6 6 to the horse-collar. This mode of attachment is old and well known and forms no part of my present invention, which consists of an improved attachment to the lower ends of the hames constructed as follows: 8 (see Fig. 2) is a metal hook, which, when attached to the lower end of the hame, as shown in Fig. 1, extends back in line with the inside of the hame. The shank 9 of the hook 8 has an offset 10, which throws it forward of the securing-ears 11 11, which embrace the hame, and are secured thereto by rivets, which pass through both ears and the hame. 12 is an auxiliary hook cast integral with the hook 8 and lying in a plane at right angles to the plane of the hames and of the hook 8, and extending in a vertical direction when in position, as shown in Fig. 1.

My improved hames are applied and secured to the collar as follows: The hook 8 of each hame is engaged with the lower end of each collar-section, as shown in Fig. 1, the hook lying in the inside crease formed by the body and roll of the collar. The hames are then swung into engagement with the outside crease of the collar, their upper ends being secured, as has already been described. In this manner the hames are quickly and securely attached to the collar without the use of bolts or puncturing of the collar, and can be as quickly removed. The lower hame-fastener, which consists of the strap 13 and rings 14, is secured in position by simply passing the rings 14 down over the vertical hooks 12.

An ordinary collar can be adapted for the reception of my improved hame by simply cutting out a section of the collar at its lower end and securing the hooks 8 in position at the cut ends. No sewing of the collar is necessary, as a flap can be left and turned over against the exposed cut ends and held in place by the integral wings 15 15 at the bend of the hook 8 on each side thereof, which will prevent the stuffing from falling out as long as the hames remain on the collar. The advantage of this arrangement is that it is not necessary to draw the ends of the collar and hames toward each other to secure the fastener, which in other fasteners involves the moving of the collar forward on the neck of the horse.

In Fig. 3 I have shown a modification in which the hooks 8 and 12 form an integral part of the metal facing or strengthening-piece 16 secured to each hame.

I claim—

1. A pair of hames for attachment to a horse-collar which is open at is lower end, each hame provided at its extreme lower end, with an upwardly extending hook adapted for engagement with the inside crease between the body and roll of the collar to hold the lower end of the hame in position upon the collar.

2. A pair of hames for attachment to a horse-collar which is open at its lower end, each hame provided at its extreme lower end with an upwardly extending hook adapted for engagement with the inside crease between the body and roll of the collar to hold the lower end of the hame in position upon the collar and a vertically projecting hook secured to the lower end of each hame and in a plane at right angles to the plane of the hames in their position upon the collar, the hooks being adapted for the reception of the ends of the lower hame fastener.

3. A pair of hames for attachment to a horse-collar which is open at its lower end, each hame being provided at its extreme lower end with an upwardly extending hook adapted for engagement with the inside crease between the body and roll of the collar to hold the lower end of the hame in position upon the collar and flat wings extending out from each side of the bend of the hook at the extreme end of the hame, and in a plane at right angles to the plane of the hook, to form a base against which the lower ends of the collar rest as and for the purpose stated.

In testimony whereof I have signed my name to this specification in the presence of two subscribing witnesses.

WILLIAM IRVINE.

Witnesses:
FREDERICK CONWAY,
W. T. MILLER.